(12) United States Patent
Delannoy

(10) Patent No.: US 7,720,578 B2
(45) Date of Patent: May 18, 2010

(54) METHOD AND DEVICE FOR PILOTING A PITCHING AIRCRAFT

(75) Inventor: Stephane Delannoy, Pujaudran (FR)

(73) Assignee: Airbus France, Toulouse (FR)

( * ) Notice: Subject to any disclaimer, the term of this patent is extended or adjusted under 35 U.S.C. 154(b) by 563 days.

(21) Appl. No.: 11/722,673

(22) PCT Filed: Jan. 31, 2006

(86) PCT No.: PCT/FR2006/000209

§ 371 (c)(1),
(2), (4) Date: Jun. 22, 2007

(87) PCT Pub. No.: WO2006/082305

PCT Pub. Date: Aug. 10, 2006

(65) Prior Publication Data

US 2009/0125165 A1 May 14, 2009

(30) Foreign Application Priority Data

Feb. 4, 2005 (FR) .................................. 05 01122

(51) Int. Cl.
*G05D 1/08* (2006.01)
(52) U.S. Cl. .......................................................... 701/4
(58) Field of Classification Search ...................... 701/3
See application file for complete search history.

(56) References Cited

U.S. PATENT DOCUMENTS 3,963,197 A * 6/1976 Oberlerchner ............... 244/181
5,112,009 A * 5/1992 Farineau ..................... 244/181
5,209,640 A * 5/1993 Moriya ........................ 416/27
2005/0051666 A1* 3/2005 Lee et al. ..................... 244/10
2005/0242234 A1* 11/2005 Mahmulyin ................ 244/75.1
2009/0138147 A1* 5/2009 Grinits et al. ................. 701/14

FOREIGN PATENT DOCUMENTS

DE 12 88 437 1/1969
DE 21 62 349 6/1973
DE 26 17 319 11/1977

OTHER PUBLICATIONS

International Search Report dated Nov. 23, 2007.

* cited by examiner

*Primary Examiner*—Thomas G Black
*Assistant Examiner*—Shelley Chen
(74) *Attorney, Agent, or Firm*—Dickinson Wright PLLC

(57) ABSTRACT

The invention relates to a method and device for piloting a pitching aircraft. The inventive device (1) comprises: means (4) for receiving an ordered load factor (NZc); means (11) for estimating a load factor (NZcg) that is applied to the aircraft; a means (12) for calculating a control order for a means (5) for deflecting a control surface (7) of the aircraft, taking account of at least the following expression $K1 \cdot NZc + K2 \cdot NZcg$, K1 and K2 representing gain values; means (13) for determining the Mach number; means (14) for determining the angle of incidence; means (15) for comparing the angle of incidence with a reference value; and means (16) for determining a modified gain value ($\Delta K2$) with the aid of the Mach number and the angle of incidence if said angle of incidence is greater than the reference value, said modified gain value ($\Delta K2$) replacing gain value K2 in the calculation performed by the calculation means (12).

13 Claims, 2 Drawing Sheets

METHOD AND DEVICE FOR PILOTING A PITCHING AIRCRAFT

The present invention relates to a method and a device for controlling an aircraft in terms of pitch, in particular a transport aircraft.

More precisely, an object of the present invention is to correct a pitch-up phenomenon, which is a spontaneous upward pitching movement of an aircraft.

It is known that the pitching moment of an aircraft depends on the lever arm between the center of gravity of the aircraft (the place where the weight is applied) and the center of lift of the aircraft (the place where the lift is applied). On a statically stable aircraft, the center of lift is situated behind the center of gravity. However, depending on the Mach number of the aircraft and the value of its angle of incidence, it is possible to stall the wing tip. The lift coefficient of the aircraft then has a tendency to decrease slightly but, by merely moving the center of lift of the aircraft much further forward, the modulus of the pitching moment decreases appreciably, since it is usually directly related to the length of the aforesaid lever arm. Instantaneously, the restoring moment for restoring the aircraft to an angle-of-incidence setting is decreased. Control of the aircraft then becomes much more difficult and the angle-of-incidence oscillation appreciably less damped. The aforesaid pitch-up phenomenon is then present.

To correct such an instability (or pitch-up), it is known practice to supplement the pitch control law with a corrective anti-pitch-up law, which is added, supposedly, to improve the behavior of the aircraft in this instability phase (of flight) by trying to relinearize the variation in the pitching moment as a function of the angle of incidence. Such a corrective anti-pitch-up law is in general very difficult to adjust, since it is the result of a compromise between the action of the standard control law and that of this added corrective law which seeks to regain the aforesaid linearity. With such a correction, the behavior of the aircraft is generally different than the behavior that it had before the pitch-up phenomenon occurred, for example more damped, but greatly slowed down, with increased inertia in maneuvers.

The corrective anti-pitch-up laws of the aforesaid standard type are therefore not completely satisfactory.

An object of the present invention is to remedy these drawbacks. It relates to a method of controlling an aircraft, in particular a transport aircraft, in terms of pitch, which makes an effective correction to a pitch-up phenomenon of the aforesaid type.

For this purpose, according to the invention, said method according to which the following series of successive steps is carried out, in an automatic and repetitive manner:

a) a controlled load factor NZc is taken into account;
b) a load factor NZcg applied to the aircraft is estimated;
c) a control command is calculated by taking into account at least the following main expression:

$$K1 \cdot NZc + K2 \cdot NZcg$$

K1 and K2 being two predetermined gain values; and d) this control command is transmitted to a means for deflecting at least one rudder of the aircraft, said deflection means generating a deflection command representative of said control command and transmitting it to at least one actuator of said rudder, is noteworthy in that the following series of successive steps is carried out in addition, in an automatic and repetitive manner, before said step c):

the actual Mach number of the aircraft is determined;
the actual angle of incidence of the aircraft is determined;
said actual angle of incidence is compared to an angle-of-incidence reference value; and
if said actual angle of incidence is greater than said reference value, a modified gain value $\Delta K2$ is determined with the aid of said actual Mach number and of said actual angle of incidence, said modified gain value $\Delta K2$ replacing said gain value K2 in the calculation of said control command in said step c).

Thus, by virtue of the invention, a corrective law is not added to the standard control law (illustrated by the aforesaid main expression), but the load factor feedback gain of this control law is modified as a function of the angle of incidence and Mach number of the aircraft, in order to counteract the effect of the pitch-up phenomenon. This makes it possible in particular for the dynamic range that the aircraft had in closed loop in the linear domain to be maintained in the domain in which said pitch-up phenomenon occurs and thus makes it possible to recover the nominal performance of the control law in this highly nonlinear domain.

In an advantageous manner, said angle-of-incidence reference value is determined with the aid of said actual Mach number of the aircraft.

It will be noted that the present invention applies to any standard control law which incorporates load factor feedback (namely, for said load factor NZcg).

In a particular embodiment, the following operations are carried out in addition:

a pitch rate q applied to the aircraft is estimated;
an integral INZ of the load factor applied to the aircraft is estimated; and
in step c), said control command is calculated by taking account, in said main expression, of the following auxiliary expression:

$$K3 \cdot q + K4 \cdot INZ$$

K3 and K4 being two predetermined gain values.

The present invention therefore also applies to a control law having, in addition to a load factor feedback, a pitch rate feedback and a load factor integral feedback.

In the latter case, said modified gain value $\Delta K2$ advantageously satisfies the following expression:

$$\Delta K2 = [m \cdot g \cdot K5 \cdot (\alpha - \alpha 0)] / [S \cdot Pdyn \cdot C z \alpha]$$

in which:

m is the mass of the aircraft;
g is the acceleration due to gravity;
K5 and $Cz\alpha$ are two variable parameters, dependent on the actual Mach number;
$\alpha$ is said actual angle of incidence;
$\alpha 0$ is said angle-of-incidence reference value;
S is a reference area of the aircraft wing; and
Pdyn is the dynamic pressure.

Thus, the modification of the gain value is based on aerodynamic coefficients (which come into the calculation of $\Delta K2$) and uses in particular the dynamic pressure Pdyn (which takes account of the effect of the speed).

The present invention also relates to a device for controlling an aircraft in terms of pitch, the purpose of which is to counteract, if appropriate, a pitch-up phenomenon of the aforesaid type.

According to the invention, said control device of the type comprising:

means for receiving a controlled load factor NZc;
means for estimating a load factor NZcg applied to the aircraft; and a calculation means for calculating a control command (according to a standard control law) by taking into account at least the following main expression:

$$K1 \cdot NZc + K2 \cdot NZcg$$

K1 and K2 being two predetermined gain values, this control command being transmitted to a means for deflecting at least one rudder of the aircraft, said deflection means generating a deflection command representative of said control command and transmitting it to at least one actuator of said rudder, is noteworthy in that it comprises in addition:

means for determining the actual Mach number of the aircraft;
means for determining the actual angle of incidence of the aircraft;
means for comparing said actual angle of incidence to an angle-of-incidence reference value; and
means for determining a modified gain value $\Delta K2$ with the aid of said actual Mach number and of said actual angle of incidence if said actual angle of incidence is greater than said reference value, said modified gain value $\Delta K2$ replacing said gain value K2 in the calculation of said control command carried out by said calculation means.

An object of the present invention is therefore to adapt the feedback gain (in terms of load factor NZcg) of a standard control law to the nonlinear pitch-up phenomenon.

In a particular embodiment:
the control device in accordance with the invention comprises in addition:
means for estimating a pitch rate q applied to the aircraft; and
means for estimating an integral INZ of the load factor applied to the aircraft; and
said calculation means is formed so as to calculate said control command by taking account, in said main expression, of the following auxiliary expression:

$$K3 \cdot q + K4 \cdot INZ$$

K3 and K4 being two predetermined gain values.

The present invention also relates to a system for controlling an aircraft, which comprises:
a means for generating a controlled load factor;
a control device such as that mentioned above, for generating a control command with the aid of said controlled load factor; and
a deflection means which generates a deflection command for at least one rudder of the aircraft with the aid of said control command and which transmits this deflection command to at least one actuator of said rudder.

Advantageously, said means for generating a controlled load factor comprises, in a standard manner, an automatic pilot and/or a control stick device.

Furthermore, in a particular embodiment, said control device is incorporated within an automatic pilot of the aircraft.

The figures of the appended drawing will elucidate the manner in which the invention may be carried out. In these figures, identical references designate similar elements.

Figure 1:
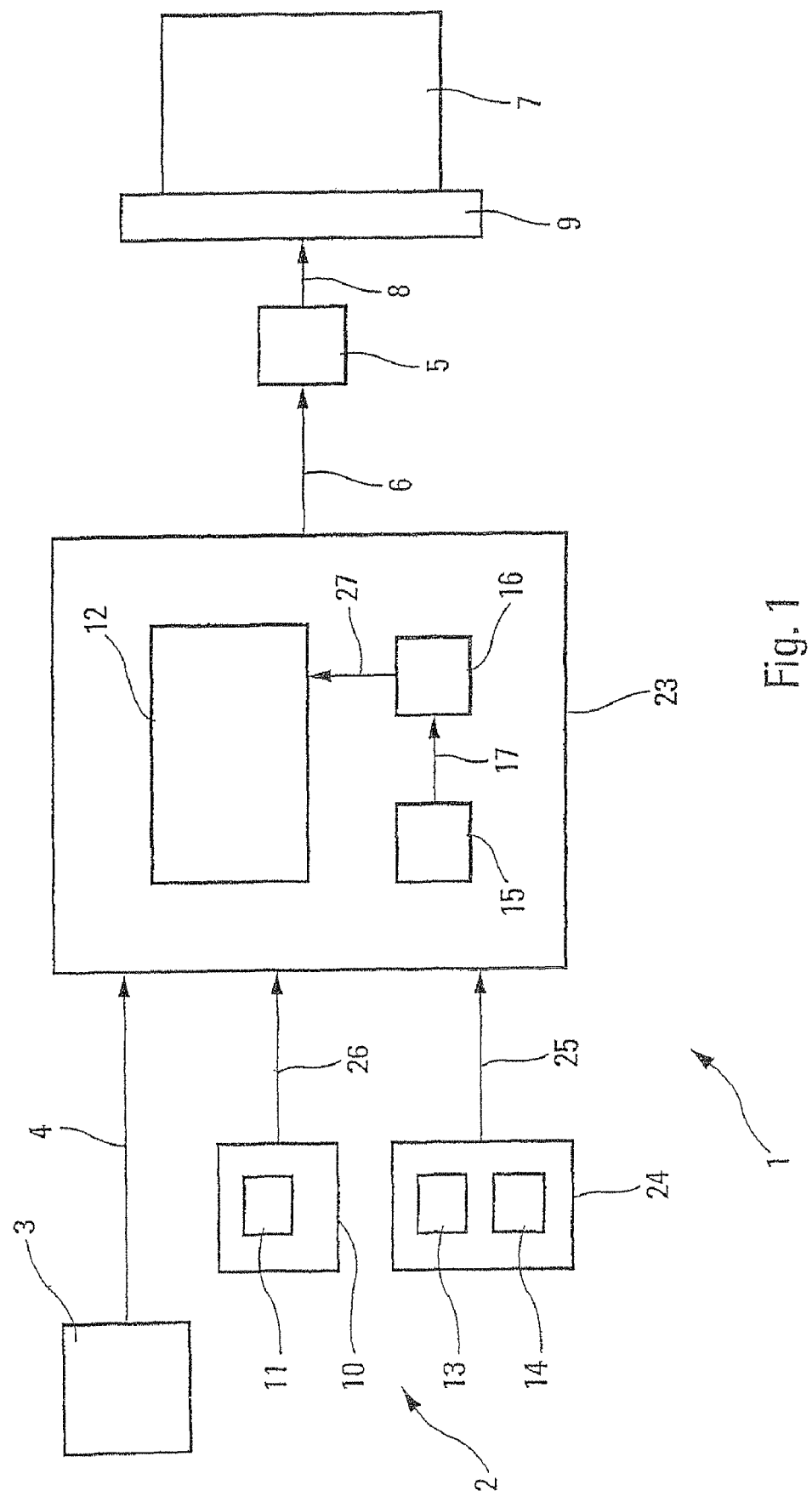
FIG. 1 is the schematic diagram of a device in accordance with the invention.

The device 1 in accordance with the invention and represented schematically in FIG. 1 is for determining pitch control commands for an aircraft (not represented), in particular a transport aircraft. For this purpose, this device 1 forms part of a standard control system 2.

Said control system 2, which is in particular intended for controlling the aircraft in terms of pitch, comprises:
a means 3 specified below for generating a controlled load factor NZc;
said control device 1 which is connected via a link 4 to said means 3 and the purpose of which is to generate a control command specified below, with the aid of the controlled load factor NZc received from said means 3; and
a deflection means 5 which is connected via a link 6 to said control device 1 and which generates, with the aid of the control command received from said device 1, a deflection command for at least one rudder 7 of the aircraft, in particular an elevator. This deflection means 5 transmits this deflection command by way of a link 8, in a standard manner, to at least one actuator 9 of said rudder 7.

Furthermore, said control device 1 is of the type comprising:
means, in particular a link 4, that make it possible to receive a controlled load factor NZc;
a set 10 of feedback information sources, which comprises in particular means 11 for estimating a load factor NZcg applied to the aircraft; and
a calculation means 12 for calculating a control command, in accordance with a control law, by taking into account at least the following main expression (1):

$$K1 \cdot NZc + K2 \cdot NZcg$$

in which K1 and K2 are two predetermined gain values.

Figure 2:
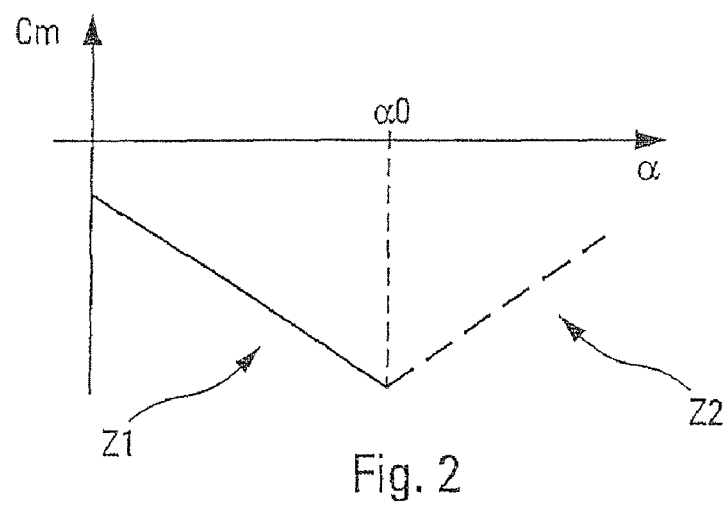
FIG. 2 is a graph that makes it possible to explain the zone in which the correction made by a device in accordance with the invention comes into play.

According to the invention, said device 1 is tailored in such a way as to be able to make an effective correction to an aircraft pitch-up phenomenon. Such a pitch-up phenomenon occurs when the actual angle-of-incidence α of the aircraft exceeds an angle-of-incidence reference value α0, as represented in the graph of FIG. 2, which shows the evolution of the pitching moment Cm of the aircraft about its center of gravity as a function of said actual angle of incidence α. In a zone Z1 corresponding to angle of incidence values below the reference value α0, normal linear behavior of the aircraft is present. Furthermore, a pitch-up domain, which is a highly nonlinear domain, is illustrated by a zone Z2, which corresponds to angle of incidence values above α0.

Accordingly, said device 1 further comprises, according to the invention:
means 13 for determining, in a standard manner, the actual Mach number of the aircraft;
means 14 for determining, also in a standard manner, the actual angle of incidence α of the aircraft;
means 15 for comparing said actual angle of incidence α received from the means 14 to the angle-of-incidence reference value α0, which may vary, as specified below; and
means 16 which are connected via a link 17 to said means 15, for determining a modified gain value $\Delta K2$ as soon as said means 15 indicate that the actual angle of incidence α is greater than said reference value α0, that is to say as soon as the aircraft is in a pitch-up domain Z2. Said means 16 calculate said modified gain value $\Delta K2$ with the aid of said actual Mach number received from said means 13 and said actual angle of incidence α received from said means 14, and they transmit (link 27) the modified gain value αK2 thus calculated to said calculation means 12 which replaces said gain value K2 with this modified gain value ΔK2 in the aforesaid main expression (1).

Moreover, said means 15 determine said angle-of-incidence reference value α0, doing so in a standard manner with the aid of the actual Mach number received from said means 13.

It will be noted that the present invention applies to any standard control law which incorporates a load factor feedback (namely, for said load factor NZcg). Thus, by virtue of the invention, a corrective law is not added to the standard control law (illustrated by the aforesaid main expression (1)), but the feedback gain αK2 in terms of load factor NZcg of this control law is modified as a function of the actual angle of incidence α and of the actual Mach number of the aircraft, in order to counteract the effects of said pitch-up phenomenon. This makes it possible in particular for the dynamic range that the aircraft had in closed loop in the linear domain Z1 to be maintained in the domain Z2 in which said pitch-up phenomenon occurs and thus makes it possible to recover the nominal performance of the control law in this highly nonlinear domain.

Figure 3:
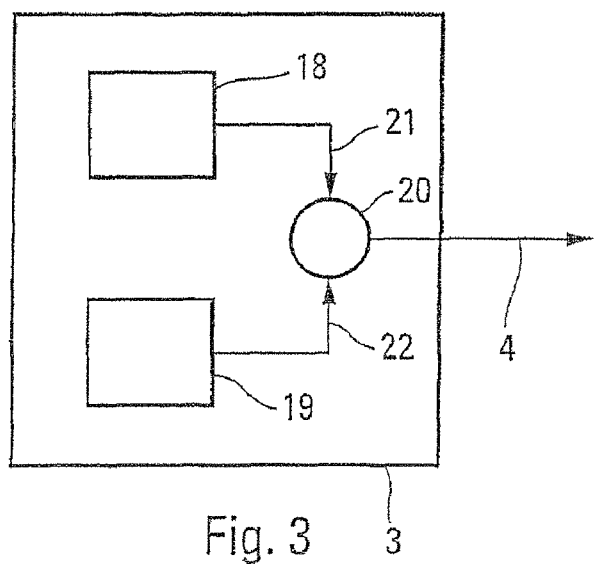
FIGS. 3 and 4 show schematically particular embodiments of specific characteristics of a device in accordance with the invention.

In a particular embodiment represented in FIG. 3, said means 3 for generating a controlled load factor NZc comprises, in a standard manner, an automatic pilot 18 which produces a first controlled load factor NZd and a standard control stick device 19 which comprises a control stick that can be operated by a pilot, and which produces a second corresponding controlled load factor NZc2, and also a calculation means 20 which is connected by way of links 21 and 22 respectively to said automatic pilot 18 and to said device 19 and which sums the two controlled load factors NZd and NZc2 to obtain said controlled load factor NZc which is transmitted to the device 1 by way of the link 4.

Furthermore, in a particular embodiment:

the calculation means 12 and the means 15 and 16 are integrated within a central processing unit 23;

the means 13 and 14 are integrated within a set 24 of information sources, which is connected by way of a link 25 to said central processing unit 23; and said set 10 of information sources is connected by a link 26 to said central processing unit 23.

Furthermore, in a particular embodiment, said control device 1 is integrated within an automatic pilot of the aircraft.

It will be noted that the present invention also applies to a control law having, in addition to a load factor NZcg feedback, a pitch rate q feedback and a feedback in terms of the integral INZ of the load factor.

Figure 4:
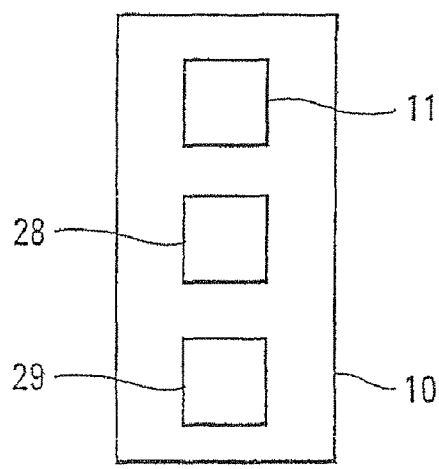

For this purpose, said set 10 comprises, in addition to said means 11, as represented in FIG. 4:

means 28 for estimating a pitch rate q applied to the aircraft; and means 29 for estimating an integral INZ of the load factor applied to the aircraft.

In this case, said calculation means 12 is formed so as to calculate said control command by taking account, in said main expression (1), of the following auxiliary expression (2):

$$K3 \cdot q + K4 \cdot INZ$$

K3 and K4 being two predetermined gain values.

Moreover, in this case, said means 16 determine said modified gain value ΔK2 directly from the following expression (3):

$$\Delta K2 = [m \cdot g \cdot K5 \cdot (\alpha - \alpha 0)] / [S \cdot Pdyn \cdot Cz\alpha]$$

in which:

m is the mass of the aircraft;

g is the acceleration due to gravity;

K5 and Czα are two variable parameters, dependent on the actual Mach number. The same holds for α0, as specified above. Preferably, these parameters α0, K5 and Czα are defined in the form of tables, as a function of said actual Mach number;

S is a reference area of the aircraft wing; and

Pdyn is the dynamic pressure.

The way in which this expression (3) for the modified gain value ΔK2 is obtained is now specified.

To this end, the following notation is used in particular:

K1, K2, K3 and K4: aforesaid gain values, namely respectively for NZc and for the feedbacks in terms of NZcg, q and INZ;

Nz: variation in the vertical load factor with respect to the equilibrium value;

q: pitch rate:

α: angle of incidence;

δq: pitch control member (tailplane);

Xf, Xg: respective positions, in meters, of the center of lift and of the center of gravity, along the longitudinal axis of the aircraft;

Cm: pitching moment of the aircraft about the center of gravity;

Cmαi: pitching moment for an angle of incidence αi;

Czα: lift coefficient of the aircraft. The lifting force Cz is obtained via Cz=Czα·α+Czα0, Czα0 being a predetermined parameter;

Czδq: lift coefficient of the tailplane;

Va: aerodynamic speed of the aircraft;

g: acceleration due to gravity;

B: pitch inertia of the aircraft;

Lcma: aerodynamic average chord;

S: wing area of the aircraft;

ρ: aerodynamic coefficient;

D: distance between the center of lift and the center of gravity of the aircraft; and Pdyn: dynamic pressure.

It is known that the equations governing the dynamic range of the aircraft are open-loop equations (in this representation, the value α is the variation in incidence with respect to the equilibrium position):

$$\begin{bmatrix} \dot{\alpha} \\ \dot{q} \end{bmatrix} = \begin{bmatrix} p\alpha & 1 \\ m\alpha & mq \end{bmatrix} \begin{bmatrix} \alpha \\ q \end{bmatrix} + \begin{bmatrix} 0 \\ m\delta q \end{bmatrix} \delta q$$

$$\frac{q}{\delta q} = \frac{m\delta q \cdot (s - p\alpha)}{s^2 - (mq + p\alpha) \cdot s + mq \cdot p\alpha - m\alpha}$$

$$\frac{Nz}{\delta q} = -\frac{Va}{g} \cdot \frac{p\alpha}{s - p\alpha} \cdot \frac{q}{\delta q}$$

by using the relation $$Nz = \frac{Va}{g} \cdot (q - \dot{\alpha})$$

The equations for the closed loop are:

$$\frac{q}{NZc} = \frac{m\delta q \cdot (s - p\alpha) \cdot [K1 \cdot s - K4]}{s^3 + (-mq - p\alpha - m\delta q \cdot K3) \cdot s^2 + \left(mq \cdot p\alpha - m\alpha + m\delta q \cdot p\alpha \cdot K3 + \frac{Va}{g} \cdot p\alpha \cdot m\delta q \cdot K2\right) \cdot s + \frac{Va}{g} \cdot p\alpha \cdot m\delta q \cdot K4}$$

$$\frac{NZcg}{NZc} = \frac{-\frac{Va}{g} \cdot m\delta q \cdot p\alpha \cdot [K1 \cdot s - K4]}{s^3 + (-mq - p\alpha - m\delta q \cdot K3) \cdot s^2 + \left(mq \cdot p\alpha - m\alpha + m\delta q \cdot p\alpha \cdot K3 + \frac{Va}{g} \cdot p\alpha \cdot m\delta q \cdot K2\right) \cdot s + \frac{Va}{g} \cdot p\alpha \cdot m\delta q \cdot K}$$

The denominator of these last two equations can also be written, by identification of closed-loop pole placement:

$$D = \left(s + \frac{1}{\tau}\right) \cdot (s^2 + 2 \cdot \xi bf \cdot \omega bf \cdot s + \omega bf^2), \text{ or else}$$

$$D = s^3 + s^2 \cdot \left(2 \cdot \xi bf \cdot \omega bf + \frac{1}{\tau}\right) + s \cdot \left(\omega bf^2 + \frac{2 \cdot \xi bf \cdot \omega bf}{\tau}\right) + \frac{\omega bf^2}{\tau}$$

The coefficient Cmα comes into this modeling only in the term mα, via the relation:

$$m\alpha = \frac{1}{B} \cdot \frac{1}{2} \cdot \rho \cdot S \cdot Lcma \cdot Va^2 \cdot Cm\alpha$$

A realistic assumption of this law is that only the nonlinear evolution of the term Cmα in the pitch-up domain Z2 has an influence on the degradation of the behavior of the aircraft because of the rapid variation in the lever arm [Xf–Xg]. The evolution of the term Czα is negligible.

Under these conditions, in order to maintain the desired dynamic range of the aircraft in the presence of a pitch-up phenomenon, and by considering the coefficient mα to have varied by Δmα, it is necessary and sufficient to modify the gain K2 by the following value ΔK2:

$$\Delta K2 = \frac{\Delta m\alpha}{\frac{Va}{g} \cdot p\alpha \cdot m\delta q}$$

The following relations hold:

$$\Delta m\alpha = \frac{1}{B} \cdot \frac{1}{2} \cdot \rho \cdot S \cdot Lcma \cdot Va^2 \cdot \Delta Cm\alpha$$

$$m\delta q = \frac{1}{B} \cdot \frac{1}{2} \cdot \rho \cdot S \cdot Lcma \cdot Va^2 \cdot Cm\delta q$$

$$Cm\delta q = \frac{D}{Lcma} \cdot Cz\delta q,$$

which remains almost constant $$p\alpha = \frac{-1}{m \cdot VA} \cdot \frac{1}{2} \cdot \rho \cdot S \cdot Va^2 \cdot Cz\alpha$$

$$Pdyn = \frac{1}{2} \cdot \rho \cdot Va^2$$

These equations yield the relation:

$$\Delta K2 = \frac{-m \cdot g}{S \cdot Pdyn \cdot Cz\alpha} \cdot \frac{\Delta Cm\alpha}{Cm\delta q}$$

Moreover, the following two, physically, very realistic assumptions are taken into account:

1/when α exceeds the value α0, Cmα which was constant hitherto (denoted Cmα0) begins to vary proportionately to (α–α0), so long as α does not become too large $Cm\alpha(\alpha>\alpha0) = Cm\alpha0 + k \cdot (\alpha - \alpha0)$ with k a constant coefficient; and 2/Cmδq is a simple function of the Mach number.

The following final relation [aforesaid expression (3)] is then obtained, giving the modified gain variation ΔK2, for α>α0 (and α0 depending on the Mach number):

$$\Delta K2 = [m \cdot g \cdot K5 \cdot (\alpha - \alpha0)] / [S \cdot Pdyn \cdot Cz\alpha]$$

in which Czα and K5 vary as a function of the Mach number.

Moreover, regarding the most general embodiment, which includes only a load factor NZcg feedback, it is known that the closed-loop transfer function may be written:

$$\frac{Nz}{\delta qcom} = \frac{-\frac{Va}{g} \cdot p\alpha \cdot m\delta q}{s^2 - (mq + p\alpha) \cdot s + mq \cdot p\alpha - m\alpha + \frac{V}{g} \cdot p\alpha \cdot m\delta q \cdot K2}$$

K2 appears in the denominator of this closed-loop transfer function, in one term only, and each time in the following form:

$$R - m\alpha + \frac{Va}{g} \cdot p\alpha \cdot m\delta q \cdot K2$$

In this formula, the term R is a general way of denoting elements that depend neither on mα nor on K2.

The modified gain value ΔK2 (for the general case with a feedback in terms of NZcg only) can be determined from the latter expressions, in a manner similar to the mode of calculation presented above in connection with simultaneous feedbacks in terms of INZ, q and NZcg.

The invention claimed is:

1. A method of controlling of an aircraft in terms of pitch, according to which method the following series of successive steps is carried out, in an automatic and repetitive manner:

a) a controlled load factor NZc is taken into account;

b) a load factor NZcg applied to the aircraft is estimated;
c) a control command is calculated by taking into account at least the following main expression:

$$K1 \cdot NZc + K2 \cdot NZcg$$

K1 and K2 being two predetermined gain values; and
d) this control command is transmitted to a deflection means (5) of at least one rudder (7) of the aircraft, said deflection means (5) generating a deflection command representative of said control command and transmitting it to at least one actuator (9) of said rudder (7), wherein the following series of successive steps is carried out in addition, in an automatic and repetitive manner, before said step c):
the actual Mach number of the aircraft is determined;
the actual angle of incidence of the aircraft is determined;
said actual angle of incidence is compared to an angle-of-incidence reference value; and
if said actual angle of incidence is greater than said reference value, a modified gain value $\Delta K2$ is determined with the aid of said actual Mach number and of said actual angle of incidence, said modified gain value $\Delta K2$ replacing said gain value K2 in the calculation of said control command in said step c).

2. The method as claimed in claim 1, wherein said reference value of the angle of incidence is determined with the aid of said actual Mach number.

3. The method as claimed in claim 1, wherein, in addition:
a pitch rate q applied to the aircraft is estimated;
an integral INZ of the load factor applied to the aircraft is estimated; and
in step c), said control command is calculated by taking account, in said main expression, of the following auxiliary expression:

$$K3 \cdot q + K4 \cdot INZ$$

K3 and K4 being two predetermined gain values.

4. The method as claimed in claim 3, wherein said modified gain value $\Delta K2$ satisfies the following expression:

$$\Delta K2 [m \cdot g \cdot K5 \cdot (\alpha - \alpha O)/[S \cdot Pdyn \cdot Cz\alpha]$$

in which:
m is the mass of the aircraft;
g is the acceleration due to gravity;
K5 and $Cz\alpha$ are two variable parameters, dependent on the actual Mach number;
$\alpha$ is said actual angle of incidence;
$\alpha O$ is said angle-of-incidence reference value;
S is a reference area of the aircraft wing; and
Pdyn is the dynamic pressure.

5. A device for controlling an aircraft in terms of pitch, said device (1) comprising:
means (4) for receiving a controlled load factor NZc;
means (11) for estimating a load factor NZcg applied to the aircraft; and
a calculation means (12) for calculating a control command by taking into account at least the following main expression:

$$K1 \cdot NZc + K2 \cdot NZcg$$

K1 and K2 being two predetermined gain values,
this control command being transmitted to a deflection means (5) of at least one rudder (7) of the aircraft, said deflection means (5) generating a deflection command representative of said control command and transmitting it to at least one actuator (9) of said rudder (7),
wherein said device (1) comprises in addition:
means (13) for determining the actual Mach number of the aircraft;
means (14) for determining the actual angle of incidence of the aircraft;
means (15) for comparing said actual angle of incidence to an angle-of-incidence reference value; and
means (16) for determining a modified gain value AK2 with the aid of said actual Mach number and of said actual angle of incidence if said actual angle of incidence is greater than said reference value, said modified gain value AK2 replacing said gain value K2 in
the calculation of said control command carried out by said calculation means (12).

6. The device as claimed in claim 5, wherein:
said device (1) comprises in addition:
means (28) for estimating a pitch rate applied to the aircraft; and
means (29) for estimating an integral INZ of the load factor applied to the aircraft; and
said calculation means (12) is formed so as to calculate said control command by taking account, in said main expression, of the following auxiliary expression:

$$K3 \cdot q + K4 \cdot INZ$$

K3 and K4 being two predetermined gain values.

7. A system for controlling an aircraft, wherein it comprises:
a means (3) for generating a controlled load factor;
a control device (1) as specified in claim 5, for determining a control command with the aid of said controlled load factor; and
a deflection means (5) which determines a deflection command for at least one rudder (7) of the aircraft with the aid of said control command and which transmits this deflection command at least one actuator(9) of said rudder (7).

8. The system as claimed in claim 7, wherein said means (3) for generating a controlled load factor comprises an automatic pilot (18).

9. The system as claimed in claim 7, wherein said means (3) for generating a controlled load factor comprises a control stick device (19).

10. The system as claimed in claim 7, wherein said control device (1) is integrated within an automatic pilot.

11. An aircraft, comprising a device (1) capable of implementing the method specified in claim 1.

12. An aircraft, comprising a device (1) such as that specified in claim 5.

13. An aircraft, comprising a system such as that specified in claim 7.

* * * * *